(12) United States Patent
Ravichandran et al.

(10) Patent No.: US 7,517,827 B2
(45) Date of Patent: Apr. 14, 2009

(54) PROCESS FOR PREPARATION OF LIQUEFIED PETROLEUM GAS SELECTIVE CRACKING CATALYST

(75) Inventors: Gopal Ravichandran, Faridabad (IN); Biswanath Sarkar, Faridabad (IN); Mohan P. Kuvettu, Faridabad (IN); Deepa Megavathu, Faridabad (IN); Sanjay K Ray, Faridabad (IN); Shiba P. Choudhury, Faridabad (IN); Sudipta Roy, Faridabad (IN); Venkatachalam Krishnan, Faridabad (IN); Satish Makhija, Faridabad (IN)

(73) Assignee: Indian Oil Company Ltd, Faridabad (IN)

( * ) Notice: Subject to any disclaimer, the term of this patent is extended or adjusted under 35 U.S.C. 154(b) by 0 days.

(21) Appl. No.: 11/506,405

(22) Filed: Aug. 17, 2006

(65) Prior Publication Data

US 2007/0203017 A1    Aug. 30, 2007

(30) Foreign Application Priority Data

Feb. 27, 2006    (IN)    ............................ 516/DEL/2006

(51) Int. Cl.
    *B01J 29/06*    (2006.01)
(52) U.S. Cl. ................... 502/63; 502/68; 502/71

(58) Field of Classification Search ................. 502/63, 502/68, 71
See application file for complete search history.

(56) References Cited

U.S. PATENT DOCUMENTS

| | | | | |
|---|---|---|---|---|
| 4,174,272 A | * | 11/1979 | Schwartz | ............... 208/120.35 |
| 4,458,023 A | * | 7/1984 | Welsh et al. | ................... 502/65 |
| 5,288,739 A | * | 2/1994 | Demmel | ..................... 502/63 |
| 6,858,556 B2 | * | 2/2005 | Kuvettu et al. | ................ 502/67 |
| 6,930,067 B2 | * | 8/2005 | O'Connor et al. | ............. 502/64 |

FOREIGN PATENT DOCUMENTS

WO    WO 96/09890    *    4/1996

* cited by examiner

*Primary Examiner*—Elizabeth D Wood
(74) *Attorney, Agent, or Firm*—Perkins Coie LLP

(57) ABSTRACT

The present invention relates to a cracking catalyst composition for cracking heavy hydrocarbon and processes for preparing the catalyst. The process can include treating zeolite with sodium free basic compound with or without phosphate, treating an alumina with a dilute acid, acidifying a colloidal silica, preparing a fine slurry of clay with a source of phosphate, adding alumina slurry and/or acidified colloidal silica to clay phosphate slurry, adding treated zeolite and spray-drying the slurry and calcining the same to obtain a cracking catalyst having adequate ABD and attrition resistance property.

29 Claims, No Drawings understand# PROCESS FOR PREPARATION OF LIQUEFIED PETROLEUM GAS SELECTIVE CRACKING CATALYST

CROSS-REFERENCE TO RELATED APPLICATION(S)

This application claims priority to Indian Patent Application No. 516/DEL/2006 filed on Feb. 27, 2006, the disclosure of which is incorporated herein by reference in its entirety.

TECHNICAL FIELD

The present invention relates to cracking catalysts suitable for enhancing a yield of producing liquefied petroleum gas (LPG) and methods of preparing such catalyst.

BACKGROUND

Catalytic cracking is widely used today to reduce heavy hydrocarbons into lighter and more useful products. One commonly used cracking catalyst is a type of crystalline inorganic synthetic products called "Y zeolites." The Y zeolites typically contain silica having discrete pores in the range 6.5 to 13.5 Å. The Y zeolites also have higher surface area and acidity as compared to other types of catalyst such as amorphous silica-alumina based catalysts. As a result, Y zeolites can generate improved catalytic activity and selectivity towards gasoline.

When preparing Y zeolites, retaining catalytic activity can be difficult. For example, the Y zeolites can be sensitive to extreme pH conditions and other process conditions. Current solutions include using basic phosphate source to improve catalytic activity of the catalyst, but at the same time, attrition resistance of the catalyst has to be sacrificed. Hence, there is a need to develop a process for maintaining catalytic activity of high silica zeolites without sacrificing attrition resistance and apparent bulk density (ABD) of resulting catalyst.

SUMMARY OF THE INVENTION

One aspect of the present invention relates to a process for the preparation of LPG selective catalyst particles comprising a medium pore zeolite low soda zeolite bonded with clay-phosphate-silica-alumina binder. The catalyst is suitable for cracking heavy residual hydrocarbon feeds.

Another aspect of the present invention relates to a process for preparing a cracking catalyst composition for cracking heavy hydrocarbon. The process can include treating a high silica low soda medium pore zeolite with an ammoniacal solution and optionally a phosphate compound, treating an alumina with a dilute acid, preparing a fine slurry of clay with a source of phosphate, adding free flowing alumina slurry to clay phosphate slurry, adding the treated zeolite and spray-drying and calcining the slurry to obtain a cracking catalyst having adequate ABD and attrition resistance property. Acidified colloidal silica can be added prior to spray drying.

A further aspect of the invention relates to a catalyst composition comprising alumina, silica, silica-alumina with clay phosphate binder for cracking heavy residual hydrocarbon feed.

DETAILED DESCRIPTION

The present disclosure describes a cracking catalyst suitable for enhancing a yield of liquefied petroleum gas and methods of preparing such catalyst. It will be appreciated that several of the details set forth below are provided to describe the following embodiments in a manner sufficient to enable a person skilled in the relevant art to make and use the disclosed embodiments. Several of the details described below, however, may not be necessary to practice certain embodiments of the invention. Additionally, the invention can include other embodiments that are within the scope of the claims but are not described in detail with respect to the following description.

One embodiment provides a cracking catalyst having adequate ABD, attrition index, enhanced catalytic activity and LPG selectivity, which is suitable for cracking heavy hydrocarbon feeds. The catalyst can include (a) treated high silica low soda medium pore zeolite in the range of 1 wt % to 50 wt %, (b) silica in the range of 0 wt % to 30 wt %, (c) alumina in the range of 1 wt % to 30 wt %, (d) clay in the range of 10 wt % to 50 wt %, and (e) phosphate in the range 1 wt % to 20 wt %.

The catalyst may be prepared by first treating the high silica low soda medium pore zeolite with alkaline component and optionally with a phosphate compound to obtain a zeolite slurry having a pH in the range of about 5-9. The resulting product can have phosphate in the range of about 1 wt % to 20 wt %, prior to the introduction of acidic binder. The stabilized zeolite is then treated with an acidic clay slurry including, for example, a clay-phosphate slurry, a clay-phosphate-silica-alumina slurry, a clay-phosphate-silica slurry, a clay-phosphate-alumina slurry, and subsequently spray dried. The clay can include kaolin, halloysite, and mixtures of these components.

The phosphate source can include phosphoric acid, ammonium dihydrogen phosphate, ammonium monohydrogen phosphate, triammonium phosphate, ammonium hypophosphate, ammonium ortho-phosphate, ammonium dihydrogen ortho-phosphate, ammonium monohydrogen ortho-phosphate, ammonium hypophosphite, ammonium dihydrogen ortho-phosphate, and mixtures thereof. The alumina can include amorphous gel alumina, aluminum trihydrate, pseudoboehmite alumina, bayrite alumina, gamma alumina, and mixtures thereof. The silica can be in colloidal form having a mean diameter ranging from about 4 nm to about 90 nm, and the product having the lowest residual soda below about 0.3 wt %. In other embodiments, the binder used in preparing the catalyst can be a slurry of clay with a phosphate source and may contain silica, alumina, or both in varying proportions.

The acid used for acidifying colloidal silica can include nitric acid, hydrochloric acid, formic acid and acetic acid or a mixture thereof. The dilute acid used for treating alumina can include nitric acid, hydrochloric acid, formic acid and acetic acid and mixtures thereof.

The catalyst can have a particle size in the range of about 20 to about 150 microns in one embodiment. In other embodiments, the catalyst can have a particle size of about 30 to about 100 microns.

Another embodiment of the present invention relates to a process for preparing a LPG selective catalyst composition for cracking heavy hydrocarbon. The process can include the steps of:

a) treating high silica low soda medium pore zeolite with an ammoniacal solution and optionally a phosphate compound to obtain a resulting zeolite slurry having pH between about 5 and about 9;

b) treating an alumina with a dilute acid and to obtain alumina binder;

c) preparing a fine slurry of clay with a source of phosphate;

d) adding free flowing alumina slurry to clay phosphate slurry;

e) optionally adding acidified colloidal silica to the alumina-clay-phosphate slurry;

f) adding treated zeolite of step (a) to the contents of step (d) or (e); and g) spray-drying the above slurry and calcining the same to obtain a cracking catalyst.

The treated zeolite has silica to alumina ratio in the range of about 5 to about 300.

The zeolite can include ZSM-5, ZSM-11, ZSM-12, ZSM-23, ZSM-35, ZSM-38, ZSM-48, ZSM-57, Zeolite beta, and mordenite. The zeolite can have a silica to alumina ratio from about 10 to about 1000.

The colloidal silica can include silica particles having a mean diameter ranging from about 4 nm to 30 nm. The colloidal silica can contain soda in the range of about 0.01 to 0.5 wt %. The colloidal silica can have a pH between about 7.0 and about 11.5, acidified to pH range of about 0.5-5. The colloidal silica is acidified using an acid including nitric acid, hydrochloric acid, formic acid, and acetic acid.

The ammonium poly-silicate can be acidified to a pH between about 0.5 and about 3.5.

The zeolite slurry can have a phosphate content in the range of about 0 to about 20 wt % calculated on a volatile-free basis.

The phosphate source used for preparing the clay slurry can include phosphoric acid, such as ortho-phosphoric acid.

The alumina can include pseudoboehmite, gel alumina and bayrite. The alumina can have a residual soda content ranging between about 0.001 and about 0.1 wt %. The alumina can be acidified using acids including acetic acid, formic acid, nitric acid, hydrochloric acid, and mixtures thereof.

Components of the catalyst are further described below on a component by component basis.

Clay

The clay can be in finely divided form with a size below about 3 microns. The clay can include kaolinite and halloysite. The clay can have a two-layer structure having alternating sheets of silica in tetrahedral configuration and alumina in octahedral configuration. These sheets are separated with a gap of 7.13 Å. A dry atmosphere equilibrated clay has moisture content of about 15 wt %. The clay is a good source for silica and alumina for containing about 45 wt % of silica and 38 wt % of alumina. In one embodiment, the clay has a particle size below about 3 microns.

Zeolites

Zeolites are synthetic or naturally occurring crystalline inorganic material characterized by properties such as ion exchange and molecular sieving. Some members of zeolite family include ZSM-5, ZSM-11, beta, and mordenite. One medium pore zeolite in cracking catalyst is ZSM-5 zeolite. This material has pores in the range 5.4 to 5.5 Å. This zeolite has good de-waxing and isomerisation abilities of hydrocarbons.

These zeolites are synthesized with $SiO_2$ to $Al_2O_3$ ratio in the range of about 10 to infinity and 0.1 to 4 wt % $Na_2O$. Soda present for balancing electrovalence is required to be exchanged with a proton, via ammonium exchange followed by calcination. Higher silica to alumina ratio zeolite may be further prepared by steaming, chemical treatment, or replacement of framework aluminum with silica. These modification steps can drastically reduce the catalytic activity of the zeolite.

In cracking processes, these zeolites lead to the production of higher LPG and high-octane gasoline. ZSM-5 zeolite cannot be employed for cracking catalyst with conventional silica alumina binders because ZSM-5 cannot sustain LPG selectivity due to the requirement of stabilization of acid sites and pores with phosphate radicals.

One embodiment of the present invention includes a process that can enhance catalytic activity of zeolite materials. Steps of zeolite activation can include reacting medium pore high silica low soda zeolite with required amount of an ammoniacal solution and optionally with a phosphate compound. Once these zeolite materials are treated with a basic component, the zeolite materials can be incorporated in an acidic catalyst binder containing clay, phosphate, silica and/or alumina.

The phosphate source can include ammonium dihydrogen phosphate, ammonium mono hydrogen phosphate, tri-ammonium phosphate, ammonium hypo phosphate, ammonium ortho-phosphate, ammonium dihydrogen ortho-phosphate, ammonium mono hydrogen ortho-phosphate, ammonium hypophosphite, ammonium dihydrogen ortho-phosphite, and mixtures thereof.

Colloidal Silica

Colloidal silica includes aqueous colloidal dispersions of silica particles, stabilized by small quantities of soda or ammonium. Colloidal silica having soda less than 0.2 wt % can be readily used for matrix or catalyst binding. Colloidal silica is stable between pH of about 8.5 and about 11. Colloidal silica is commercially available in varying particle size ranging from 7 to 22 nm. However, pH of these colloidal silica materials may be lowered in the range of about 1 to about 3 employing mineral and/or organic acids for enhancing binding property.

Alumina

Pseudoboehmite alumina with soda, less than 0.1 wt % can be used as binders for different zeolite based catalysts because the alumina can be converted to a glue by reacting with acids like nitric acid, formic acid, or acetic acid. Glue alumina can be mixed with a zeolite, clay-phosphate and colloidal silica and spray dried. Once spray dried product is calcined, alumina can be transformed into the gamma phase, which is a hard material that can hold clay, zeolite and other catalyst ingredients together to form attrition resistant mass. In addition, other species of alumina, such as aluminum trihydrate, bayrite, gamma alumina can also be used for enhancing binding and catalytic activity with respect to cracking of heavier hydrocarbons.

Cracking Catalyst

One embodiment of the present invention provides a process for preparing a cracking catalyst by (a) preparing a conditioned medium pore high silica low soda zeolite by reacting dry zeolite with loss on ignition below 3 wt %, with a ammoniacal solution, (b) preparing silica-alumina-clay-phosphate binder by homogenising acidified colloidal silica and/or, alumina with a clay phosphate binder, (c) adding finely ground slurry of conditioned zeolite to the binder to obtain a slurry ready for spray drying having composition, 1 to 50 wt % conditioned low soda zeolite, 1 to 20 wt % alumina, 0 to 20 wt % silica, 10 to 50 wt % kaolin clay and 1 to 20 wt % phosphoric acid, (d) drying the slurry, and (e) calcination.

The present invention is further explained in the form of following examples 2, 7, and 8. However, these examples should not be construed as limiting the scope of the invention. Examples 2, 7 and 8 show that the pretreated zeolite of the present invention exhibits superior catalytic activity, LPG selectivity, and attrition index in comparison to the untreated zeolites of examples 1 and 3-6.

EXAMPLES

Example 1

98.63 gm of Pural SB grade alumina (having loss on ignition of 23.96 wt %) was made into a slurry with 425 gm of Demineralised (DM) water. The slurry was peptized with 21.52 gm of formic acid (85% concentration). 426.7 gm of ZSM-5 zeolite (loss on ignition 12.12 wt %) having silica to alumina molar ratio of 30 was made into a slurry with 490 gm of DM water and milled to a fine paste to produce a zeolite slurry having pH of 7.0. 1022.45 gm of kaolin clay (having loss on ignition 14.91 wt %) was made into a slurry with 1107 gm DM water and kept under vigorous stirring while 218.45 gm of ortho-phosphoric acid (concentration 85 wt %) was added. Earlier prepared alumina gel and zeolite slurry were added to the clay-phosphate slurry one after another under vigorous stirring. Final slurry having a pH of about 1.8 was spray dried in a counter current spray drier having two fluid nozzles. Spray dried product was calcined at 500° C. Calcined catalyst showed ABD of 0.8 g/cc and attrition index of 2. Calcined catalyst was impregnated with 400 ppm Nickel and 7500 ppm Vanadium and steam deactivated at 750° C. for three hours.

Steam deactivated catalyst was evaluated in an ACE micro reactor employing a resid FCC feed having physical properties shown in Table 1. For performance evaluation, 5% ZSM-5 additive was mixed with 95% equilibrated RFCC catalysts. Performance results are shown in a Table 2.

Example 2

98.63 gm of Pural SB grade alumina (having loss on ignition of 23.96 wt %) was made into a slurry with 425 gm of DM water. The slurry was peptized with 21.52 gm of formic acid (85% concentration). 426.7 gm of ZSM-5 zeolite (loss on ignition 12.12 wt %) having silica to alumina molar ratio of 30 was made into a slurry with 490 gm of 5% ammonical solution to produce a zeolite slurry having pH of 8.2. 1022.45 gm of kaolin clay (having loss on ignition 14.91 wt %) was made into a slurry with 1107 gm DM water and kept under vigorous stirring while 219.25 gm of ortho-phosphoric acid (concentration 85 wt %) was added. Earlier prepared alumina gel and zeolite slurry were added to the clay-phosphate slurry one after another under vigorous stirring. Final slurry having pH of 2.53 was spray dried similar to slurry of Example 1 and the product was processed further. Spray dried product showed ABD of 0.79 with attrition index of 2.2.

TABLE 1

| PROPERTIES | VALUES |
| --- | --- |
| Sp. Gravity at 15° C. | 0.936 |
| CCR (wt. %) | 2.8 |
| V (ppm. wt.) | 3.5 |
| Ni (ppm wt.) | 5 |
| Saturates, PRC, NR (wt %) | 45.3 |
| Aromatics (wt %) | 54.7 |
| IBP ° C. | 236 |
| 10% | 304 |
| 50% | 408 |
| 90% | 520 |
| FBP | 554 |

Example 3

98.63 gm of Pural SB grade alumina (having loss on ignition of 23.96 wt %) was made into a slurry with 425 gm of DM water. The slurry was peptised with 21.52 gm of formic acid (85% concentration) . . . 426.7 gm of ZSM-5 zeolite (loss on ignition 12.12 wt %) having silica to alumina molar ratio of 30 was made into a slurry with 490 gm of DM water and milled to produce a fine slurry of pH 7. 1022.45 gm of kaolin clay (having loss on ignition 14.91 wt %) was made into a slurry with 1107 gm DM water and kept under vigorous stirring while 163.83 gm of ortho-phosphoric acid (concentration 85 wt %) was added. To clay-phosphate slurry, alumina gel and zeolite slurry were added one after another under vigorous stirring. This was followed by the addition of 130 gm of basic phosphate solution containing 62.56 gm of di-ammonium hydrogen phosphate. Final slurry having pH: 2.53 was spray dried similar to slurry of example 1 and the product was processed further. Spray dried product showed ABD of 0.77 with attrition index of 3.

Example 4

98.63 gm of Pural SB grade alumina (having loss on ignition of 23.96 wt %) was made into a slurry with 425 gm of DM water. The slurry was peptized with 21.52 gm of formic acid (85% concentration). 426.7 gm of ZSM-5 zeolite (loss on ignition 12.12 wt %), having silica to alumina molar ratio of 30, was made into a slurry with 490 gm of DM water and milled to a fine paste to produce a zeolite slurry having pH of 7.0. 1022.45 gm of kaolin clay (having loss on ignition 14.91 wt %) was made into a slurry with 1107 gm DM water and kept under vigorous stirring while 218.45 gm of ortho-phosphoric acid (concentration 85 wt %) was added. To clay-phosphate slurry earlier prepared alumina gel and zeolite slurry were added one after another under vigorous stirring. Final slurry having pH of 1.8 was vigorously stirred under addition of ammonical water (25%) and pH was raised to 8. This slurry was spray dried similar to slurry of example 1 and the product was processed further. Spray dried product showed ABD of 0.69 with attrition index of 15.

Example 5

98.63 gm of Pural SB grade alumina (having loss on ignition of 23.96 wt %) was made into a slurry with 425 gm of DM water. The slurry was peptized with 21.52 gm of formic acid (85% concentration). 426.7 gm of ZSM-5 zeolite (loss on ignition 12.12 wt %) having silica to alumina molar ratio of 30 was made into a slurry with 490 gm of diluted ortho-phosphoric acid containing 54.61 gm acid and milled to a fine paste to produce a zeolite slurry having pH of 1. 1022.45 gm of kaolin clay (having loss on ignition 14.91 wt %) was made into a slurry with 1107 gm DM water and kept under vigorous stirring while 163.83 gm of ortho-phosphoric acid (concentration 85 wt %) was added. To clay-phosphate slurry earlier prepared alumina gel and zeolite slurry were added one after another under vigorous stirring. Final slurry having pH of 1.8 was spray dried. Spray dried product was calcined. This product showed an ABD of 0.78 g/cc with attrition index of 2. Calcined product was impregnated with metals content similar to that of example 1, processed and evaluated for performance.

Example 6

243.48 gm of Ammonium Poly Silicate (having solid content 31 wt %) was mixed with 279.5 gm of DM water and the resultant solution was acidified with 10.75 gm of formic acid (85% concentration). 426.7 gm of ZSM-5 zeolite (loss on ignition 12.12 wt %) having silica to alumina molar ratio of 30 was made into a slurry with 490 gm of diluted ortho-phosphoric acid containing 54.61 gm acid and milled to a fine paste to produce a zeolite slurry having pH of 1.1022.45 gm of kaolin clay (having loss on ignition 14.91 wt %) was made into a slurry with 1107 gm DM water and kept under vigorous stirring while 163.83 gm of ortho-phosphoric acid (concentration 85 wt %) was added. To clay-phosphate slurry earlier prepared alumina gel and zeolite slurry were added one after another under vigorous stirring. Final slurry having pH of 1.8 was spray dried. Spray dried product was calcined. This product showed an ABD of 0.8 g/cc with attrition index of 1.8. Calcined product was impregnated with metals content similar to that of example 1, processed and evaluated for performance.

Example 7

98.63 gm of Pural SB grade alumina (having loss on ignition of 23.96 wt %) was made into a slurry with 425 gm of DM water. The slurry was peptised with 21.52 gm of formic acid (85% concentration). 426.7 gm of ZSM-5 zeolite (loss on ignition 12.12 wt %) having silica to alumina molar ratio of 30 was made into a slurry with 490 gm of 10% ammonical solution followed by addition of 27.7 g phosphoric acid (85%) to produce a zeolite slurry having pH of 7.5. 1022.45 gm of kaolin clay (having loss on ignition 14.91 wt %) was made into a slurry with 1107 gm DM water and kept under vigorous stirring while 191.53 gm of ortho-phosphoric acid (concentration 85 wt %) was added. To clay-phosphate slurry earlier prepared alumina sol and zeolite slurry were added one after another under vigorous stirring. Final slurry having pH of 2.53 was spray dried similar to slurry of example 1 and the product was processed further. Spray dried product showed ABD of 0.79 with attrition index of 2.2. This catalyst has shown LPG yield of 18.2 wt % with a conversion of 60.2%.

Example 8

49.32 gm of Pural SB grade alumina (having loss on ignition of 23.96 wt %) was made into a slurry with 213 gm of DM water. The slurry was peptised with 10.75 gm of formic acid (85% concentration). 121.75 gm of Ammonium Poly Silicate (having solid content 31 wt %) was added to 140 gm of DM water and acidified with 5.38 gm of formic acid (85% concentration). 426.7 gm of ZSM-5 zeolite (loss on ignition 12.12 wt %) having silica to alumina molar ratio of 30 was made into a slurry with 490 gm of 5% ammonical solution to produce a zeolite slurry having pH of 8.2. 1022.45 gm of kaolin clay (having loss on ignition 14.91 wt %) was made into a slurry with 1107 gm DM water and kept under vigorous stirring while 219.25 gm of ortho-phosphoric acid (concentration 85 wt %) was added. To clay-phosphate, slurry earlier prepared alumina sol, silica sol and zeolite slurry were added one after another under vigorous stirring. Final slurry having pH of 2.45 was spray dried similar to slurry of example 1 and the product was processed further. Spray dried product showed ABD of 0.8 with attrition index of 2. This catalyst has shown LPG yield of 18.3 wt %, DG 2.8 wt %, with a conversion of 60.8%.

TABLE 2

| Components | Base | 95 wt % Base + Cat. of example 1 | 95 wt % Base + 5 wt % Cat of example 2 | 95 wt % Base + 5 wt % Cat of example 3 | 95 wt % Base + 5 wt % Cat of example 4 | 95 wt % Base + 5 wt % Cat of example 5 | 95 wt % Base + 5 wt % Cat of example 6 |
|---|---|---|---|---|---|---|---|
| DG | 2.15 | 2.21 | 2.33 | 2.68 | 2.22 | 2.16 | 2.22 |
| LPG | 12.09 | 14.18 | 18.93 | 16.61 | 14.66 | 13.71 | 16.8 |
| Gasoline | 24.49 | 26.61 | 21.2 | 19.7 | 22.8 | 23.95 | 21.53 |
| Heavy naphtha | 11.39 | 11.22 | 9.65 | 9.55 | 9.98 | 9.9 | 9.52 |
| LCO | 25.83 | 24.00 | 26.2 | 23.68 | 24.05 | 26.54 | 26.3 |
| Bottoms | 14.64 | 13.16 | 12.23 | 15.61 | 16.79 | 14.31 | 14.5 |
| Conversion | 59.52 | 62.84 | 61.37 | 60.71 | 59.17 | 59.15 | 61 |

[1] A catalyst to oil ratio of 5.38 is used, and the catalyst being 5 wt % on a base catalyst.

We claim:

1. A process for preparing a catalyst composition for cracking heavy hydrocarbon, comprising:
   treating a high silica low soda medium pore zeolite with an ammoniacal solution to obtain a zeolite slurry having a pH between about 5 to about 9;
   treating an alumina with a dilute acid to obtain an alumina binder;
   preparing an acidic clay slurry with a source of phosphate;
   combining the treated zeolite, the alumina binder, and the clay slurry, to obtain a slurry mixture; and
   spray-drying and calcining the slurry mixture to obtain the catalyst.

2. The process of claim 1, wherein the zeolite includes at least one of ZSM-5, ZSM-11, ZSM-12, ZSM-23, ZSM-35, ZSM-38, ZSM-48, ZSM-57, Zeolite beta, and mordenite.

3. The process of claim 1, wherein the alumina is selected from a group consisting of pseudoboehmite alumina, boehmite, aluminum trihydrate, bayrite alumina, and gamma alumina.

4. The process of claim 1, wherein the dilute acid for treating alumina is selected from a group consisting of nitric acid, hydrochloric acid, formic acid, and acetic acid.

5. The process of claim 1, wherein the alumina has a soda content in the range of between about 0.001 and about 0.1 wt %.

6. The process of claim 1, wherein the clay is selected from a group consisting of kaolin, and halloysite.

7. The process of claim 1, wherein the phosphate source used for preparing the clay slurry includes ortho-phosphoric acid.

8. A LPG selective catalyst composition for cracking heavy residual hydrocarbon feed, comprising:
   a high silica low soda medium pore zeolite in the range of about 1 wt % to about 50 wt %, wherein the high silica low soda medium pore zeolite is treated with a ammoniacal solution to obtain a zeolite slurry having a pH between about 5 to about 9;
   a low soda colloidal silica in the range of about 0 wt % to about 30 wt %;
   alumina in the range of about 1 wt % to about 30 wt %;
   clay in the range of about 10 wt % to about 50 wt %; and
   phosphate in the range about 1 wt % to about 20 wt %.

9. The catalyst of claim 8, wherein Zeolite is selected from a group consisting of ZSM-5, ZSM-11, ZSM-12, ZSM-23, ZSM-35, ZSM-38, ZSM-48, ZSM-57, Zeolite beta, mordenite.

10. The catalyst of claim 8, wherein the silica is colloidal silica includes ammonium and/or sodium stabilized poly silicate.

11. The catalyst of claim 8, wherein the particle size of silica is in the range of from about 4 nm to about 10 nm.

12. The catalyst of claim 8, wherein the alumina is selected from a group consisting of pseudoboehmite, boehmite, aluminum trihydrate, bayrite alumina, gamma alumina.

13. The catalyst of claim 8, wherein the clay is selected from kaolin, holloysite.

14. The catalyst of claim 8, wherein the phosphate is selected from a group consisting of ortho-phosphoric acid, ammonium dihydrogen phosphate, ammonium monohydrogen phosphate, triammonium phosphate, ammonium hypophosphate, ammonium ortho-phosphate, ammonium dihydrogen ortho-phosphate, ammonium monohydrogen ortho-phosphate, ammonium hypophosphite, ammonium dihydrogen ortho-phosphite.

15. The catalyst of claim 8, wherein the particle size of the catalyst is in the range of about 20-150 microns.

16. The catalyst of claim 8, wherein the particle size of the catalyst is in the range of about 30-100 microns.

17. A LPG selective catalyst composition for cracking heavy hydrocarbon feed, comprising:
   a high silica low soda medium pore zeolite in the range of about 1 wt % to about 50 wt %, wherein the high silica low soda medium pore zeolite is treated with an ammoniacal solution to obtain a zeolite slurry having a pH between about 5 to about 9;
   a low soda colloidal silica in the range of about 0 wt % to about 30 wt %;
   alumina in the range of about 1 wt % to about 30 wt %;
   clay in the range of about 10 wt % to about 50 wt %; and
   phosphate in the range about 1 wt % to about 20 wt %.

18. The process of claim 1 wherein acidified colloidal silica is further added prior to spray drying.

19. The process of claim 18, wherein the colloidal silica is sodium and/or ammonium stabilized poly silicate.

20. The process of claim 18, wherein the colloidal silica having a pH between about 7.0 and about 11.5.

21. The process of claim 18, wherein colloidal silica is acidified to a pH between about 0.5 and about 3.5 before use.

22. The process of claim 18, wherein the acid used for acidifying colloidal silica is selected from a group consisting of nitric acid, hydrochloric acid, formic acid, and acetic acid.

23. The process of claim 18, wherein the colloidal silica includes silica particles having a mean diameter ranging between 4 to 30 nm.

24. The process of claim 18, wherein the colloidal silica has soda or ammonia in the range between about 0.1 to about 0.8 wt %.

25. A process for preparing a catalyst composition for cracking heavy hydrocarbon, comprising:
   treating a high silica low soda medium pore zeolite with ammoniacal solution and a phosphate compound to obtain a zeolite slurry having a pH between about 5 to about 9;
   treating an alumina with a dilute acid to obtain an alumina binder;
   preparing a clay slurry with a source of phosphate;
   combining the treated zeolite, the alumina binder, the clay slurry to obtain a slurry mixture; and
   spray-drying and calcining the slurry mixture to obtain the catalyst.

26. The process of claim 25, wherein the phosphate compound is selected from a group consisting of ammonium dihydrogen phosphate, ammonium monohydrogen phosphate, triammonium phosphate, ammonium hypophosphate, ammonium ortho-phosphate, ammonium dihydrogen ortho-phosphate, ammonium monohydrogen ortho-phosphate, ammonium hypophosphite, ammonium dihydrogen ortho-phosphite, and ortho-phosphoric acid.

27. The process of claim 25 wherein acidified colloidal silica is further added prior to spray drying.

28. The catalyst of claim 8 wherein the high silica low soda medium pore zeolite is further treated with a phosphate compound.

29. The LPG selective catalyst composition of claim 17 wherein the high silica low soda medium pore zeolite is further treated with a phosphate compound.

* * * * *